United States Patent [19]
Henoch

[11] Patent Number: 5,379,042
[45] Date of Patent: Jan. 3, 1995

[54] METHOD OF STORING DATA RELATING TO THE LIFE OF A COMPLICATED PRODUCT

[76] Inventor: Bengt Henoch, Backvindeln 90, S-126 57 Hägersten, Sweden

[21] Appl. No.: 941,145
[22] PCT Filed: May 14, 1991
[86] PCT No.: PCT/SE91/00341
§ 371 Date: Nov. 12, 1992
§ 102(e) Date: Nov. 12, 1992
[87] PCT Pub. No.: WO91/18452
PCT Pub. Date: Nov. 28, 1991

[30] Foreign Application Priority Data

May 14, 1990 [SE] Sweden .............................. 9001729-4

[51] Int. Cl.⁶ .............................................. G01S 13/80
[52] U.S. Cl. ........................................ 342/42; 342/50; 342/51
[58] Field of Search ...................... 342/42, 44, 51, 50

[56] References Cited

U.S. PATENT DOCUMENTS

| | | | |
|---|---|---|---|
| 3,774,205 | 11/1973 | Smith et al. | 342/44 |
| 3,780,368 | 12/1973 | Northeved et al. | 342/44 |
| 3,832,530 | 8/1974 | Reitboeck et al. | 342/44 X |
| 4,358,765 | 11/1982 | Henoch et al. | 342/51 |
| 4,390,880 | 6/1983 | Henoch | 342/50 |
| 4,714,925 | 12/1987 | Bartlett | 340/825.55 |
| 4,827,395 | 5/1989 | Anders et al. | 364/138 |
| 4,912,471 | 3/1990 | Tyburski et al. | 342/42 |
| 4,937,581 | 6/1990 | Baldwin et al. | 342/44 |
| 4,963,887 | 10/1990 | Kawashima et al. | 342/44 |
| 5,021,790 | 6/1991 | Ohta et al. | 342/44 |
| 5,030,807 | 7/1991 | Landt et al. | 235/375 |
| 5,055,659 | 10/1991 | Hendrick et al. | 235/439 |
| 5,164,732 | 11/1992 | Brockelsby et al. | 342/44 |

FOREIGN PATENT DOCUMENTS

| | | |
|---|---|---|
| 3729941 | 3/1989 | Germany . |
| 380220 | 11/1975 | Sweden . |
| 2076259 | 11/1981 | United Kingdom . |
| 9003070 | 3/1990 | WIPO . |

Primary Examiner—John B. Sotomayor
Attorney, Agent, or Firm—Nies, Kurz, Bergert & Tamburro

[57] ABSTRACT

A method for storing the life data of complicated products, primarily different types of automotive product, particularly cars, by the contactless transmission of information between a transmitter/receiver unit and a transponder. The transmitter/receiver unit includes one or more oscillators, transmitter and receiver antennas, a modulator and a detection circuit, and the transponder includes a transmitter/receiver antenna, a modulator and a detection circuit. The transponder is intended to accompany the product during its manufacture and to also accompany the finished product. The transponder (24; 29) is caused to communicate in a contactless fashion with both the transmitter/receiver unit (27; 28; 20) and a transmitter device which is located in a product and incorporated in a data network in the vehicle, by making the data network in the product identical to or compatible with the data network used for the contactless transmission between the transmitter/receiver unit (27; 28; 20) and the transponder (24; 29) in the manufacture of the product.

13 Claims, 2 Drawing Sheets

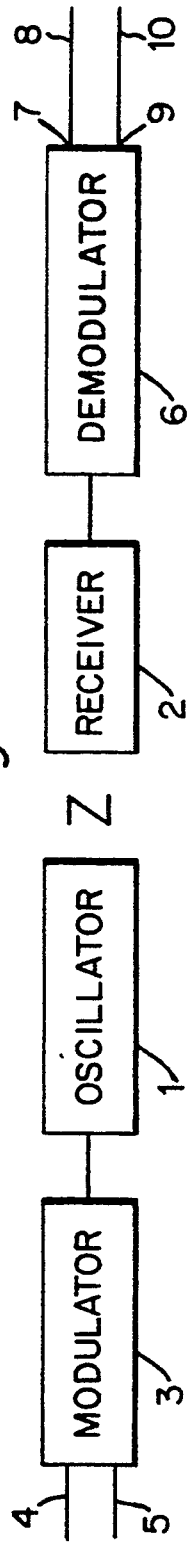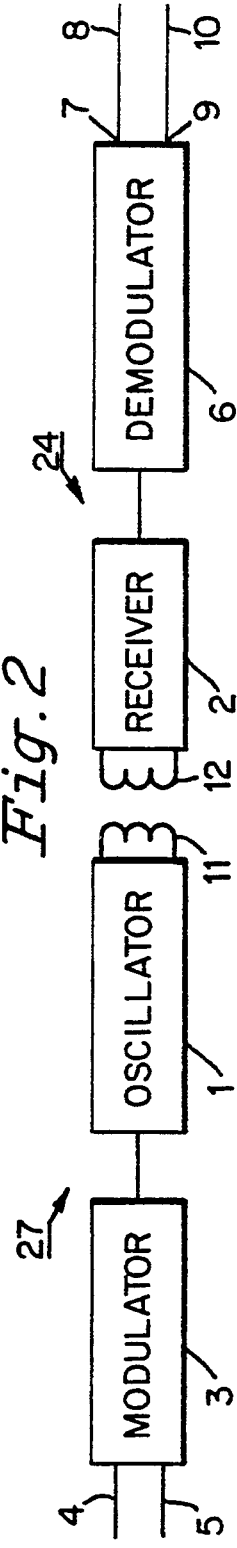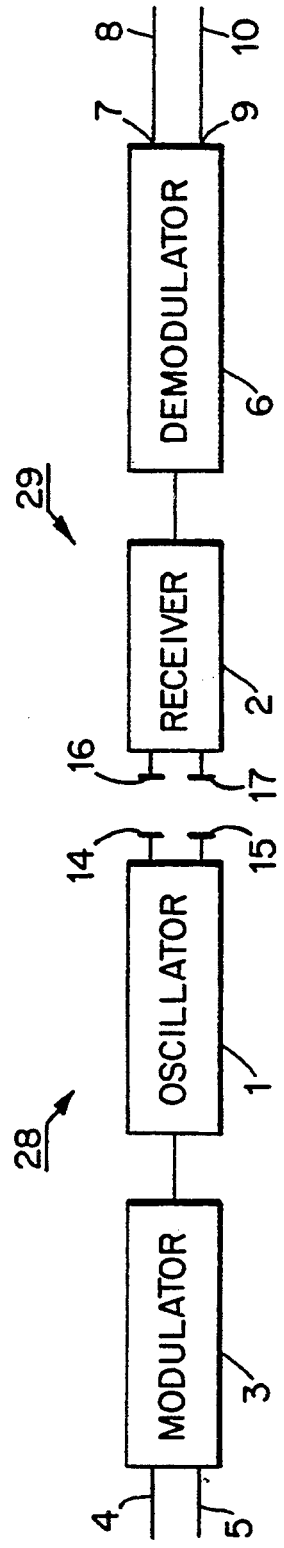

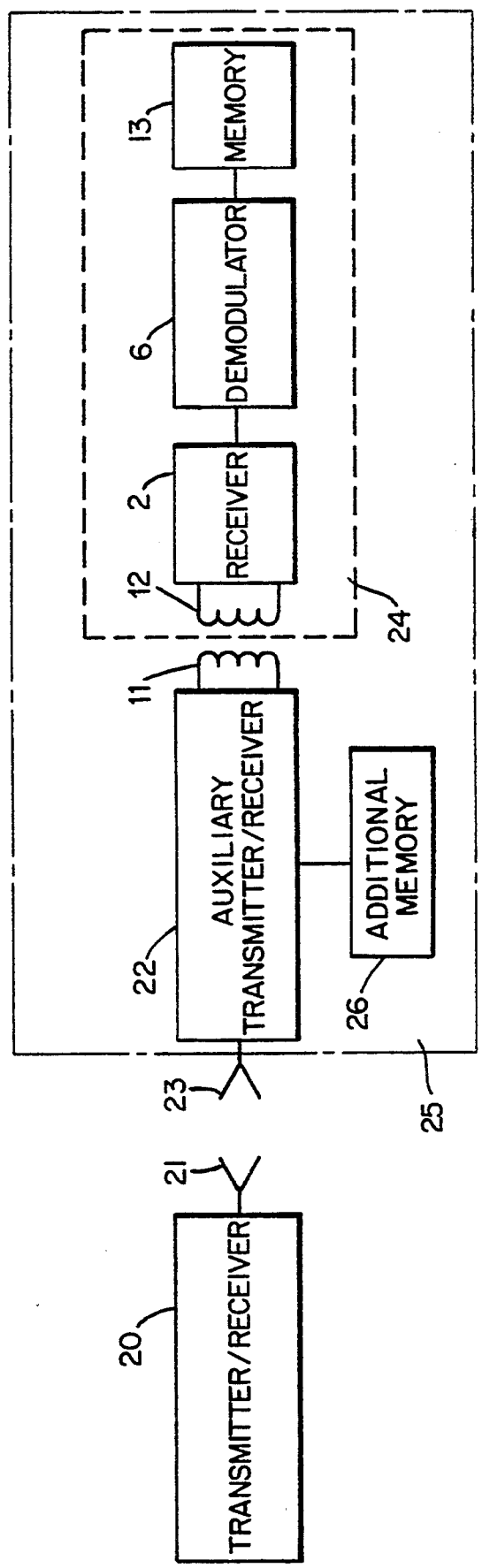

METHOD OF STORING DATA RELATING TO THE LIFE OF A COMPLICATED PRODUCT

BACKGROUND OF THE INVENTION

1. Field of the Invention

The present invention relates to a method of storing data relating to the life or history of complicated products. An example of such products are various kinds of automotive vehicles, particularly cars.

2. Description of the Related Art

The kind of device used to this end is a transponder, a registration transmitter or a so-called escort memory. A common feature of all devices of this kind is that they are able to communicate with a so-called registration unit which includes a transmitter/receiver unit. This communication is two-directional, since the registration unit is able to transmit a signal containing information which is received by the transponder and stored therein. Furthermore, the registration unit can transmit a query signal which is reflected by the transponder while the signal is modulated with a signal corresponding to the information found stored in the transponder. By reflection is meant that the transmitted query signal is received by the transponder and re-transmitted without adding new energy to the signal. Registration units and transponders of this kind are known from the Swedish Patent Specification Nos. 7503620-2, which has a corresponding U.S. Pat. No. 4,242,661, to Bengt Henoch and Eilert Berglind, dated Dec. 30, 1980, and 7609732-8, which has a corresponding U.S. Pat. No. 4,390,880, to Bengt Henoch, dated Jun. 28, 1983, among others.

In modern product and service apparatus, it is important that data is continuously collected and stored with respect to the complicated product concerned, and that the correct data is available at the right time for the right product.

This is particularly important in the case of so-called computer assisted and computer integrated manufacture, CAM and CIM, where data feedback relating to complicated products, such as cars, household machines, etc., is essential during the whole of their life cycle.

In automated and computer assisted production lines for complicated products, for example cars, it is normal to use transponders or escort memories fitted to the product, so that different production data is automatically stored on the product.

Such registration transmitter, transponders or escort memories are well known to the art. These units are based on a two-way communication link which utilizes electromagnetic waves in a frequency range of from 100 kHz and up to IR.

Such registration transmitters have properties which are adapted to different applications, with respect to signal range, memory capacity, data speed, etc.

One requirement in the car industry is that the registration transmitter shall be able to pass through varnishing furnaces heated to temperatures of up to 250° C. This requirement is satisfied by providing the registration transmitter with a heat protector, or by supplying the registration transmitter with energy in a cordless fashion from the registration unit and therewith omitting a battery, although the range is much smaller in this case.

When using a registration transmitters or escort memories in a production line, the registration transmitters or escort memories are reused subsequent to having passed through a production line, i.e. are returned to the beginning of the line and fitted to a new product. It is also normal to use different registration transmitters in different sections of a production line.

It is desirable to be able to use one and the same registration transmitter throughout the whole of the production line, and also to allow such a registration transmitter to stay permanently with the product, the car, and therewith provide a function in subsequent service and maintenance of the vehicle. It has not been possible to fulfil these desiderata for several reasons, as will be explained below.

One problem with the use of such registration transmitters or transponders in storing life data relation to a product, such as a car, is that they must be so inexpensive as to render it unnecessary to reuse the same for cost reasons. The actual problem lies in the fact that a transponder which will fulfil requirements during manufacture of the product and which will communicate with a computer in the finished product has hitherto been much too expensive. This drawback is associated, among other things, with the necessary maximum range of information transmission which must necessarily be found in certain sections of the production line, and also the large amount of data which needs to be stored in the transponder in certain stages of manufacture. In order to obtain a sufficiently long range, it is necessary to transmit the information in the form, for instance, of signals of microwave frequency. However, the expense incurred by the use of such techniques is totally unacceptable when the transponder is mounted in the finished product for the purpose of exchanging information with a local computer. Furthermore, the maximum amount of data required in manufacture is greater than what is necessary in the finished product.

These problems are solved by the present invention.

The Swedish Patent Specification No. 8802230-6, which has a PCT International Publication No. WO 89/12935 dated Dec. 28, 1989, teaches an arrangement for the contactless transmission of a serial two-wire data bus, comprising a clock line and a data line connected to a transmitter, a receiver and a demodulator. The transmitter includes an oscillator and a modulator which is intended for modulating the signal generated by the oscillator in response to the signal on the clock line and date line respectively. The invention according to this patent is characterized in that the modulator is constructed to perform two significant, separate modulation steps which do not coincide in time on the signal generated by the oscillator, and consequently two independent signal channels are formed, of which a first is intended to carry data signals and the other to carry clock signals. The demodulator is intended to demodulate a signal which has been modulated by the receiver and received in the aforesaid manner, and is constructed to recreate the aforesaid two signals. The demodulator has a clock-like output and a data-line output.

This patent specification thus teaches a method of separating the data and clock lines, despite using only one signal communication signal with the contactless transmission of data.

The Swedish Patent Specification No. (Patent Application 8902808-8) teaches an advantageous method of enabling in such data buses or other data links the signals transmitted from the master side to be used as guide oscillators on the slave side, and therewith to enable the slave side to transmit signals which are received on the master side without the signals transmitted by the master side disturbing reception of the signals transmitted from the slave side and without the occurrence of zero points, so-called nodes, in the signal arriving from the slave side.

Patent Specification No. (Patent Application 8902808-8), which has a PCT International Publication No. WO 91/03109, dated Mar. 7, 1991, teaches a method of contactless transmission of information between a transmitter/receiver unit and a transponder, this transmitter/receiver unit including oscillators, transmitting and receiving antennas, a modulator and a detection circuit. The transponder includes a transmitter/receiver antenna, a modulator and a detection circuit. The invention is characterized in that the transmitter/receiver unit is caused to transmit a first and a second carrier wave which have different frequencies (f1, f2) but the same phase; in that the difference frequency is formed in the transponder; in that a third signal having the difference frequency (f3) is caused to be divided into a fourth signal having half the difference frequency (f4); in that the fourth signal is caused to modulate the two carrier waves received in the transponder by applying the carrier waves to a diode or the like, so that the received carrier waves are reflected back to the transmitter/receiver unit; in that the signal received in the transmitter/receiver unit is mixed therein with one of the frequencies of the first or the second carrier waves; and in that the two sidebands on respective sides of the carrier wave frequency at which said mixing takes place are produced, these sidebands differing from the last mentioned carrier wave frequency by a frequency which is equal to half the difference frequency (f4), wherein that sideband which has a frequency midway of the carrier wave frequency is a superimposed sideband which is caused to have an amplitude which differs from the amplitude of the other sideband, and wherein the pair of sidebands are filtered out and detected in the detecting circuit of the transmitter/receiver unit with respect to the information content of said sideband pair.

Thus, in combination, these two last mentioned patent specifications teach a method of designing a contactless communication link inexpensively, in that only one communication signal is required and in that the transponder need not include a local oscillator.

Although these patent publications describe techniques which provide an inexpensive transponder, the patent specifications do not disclose how such an inexpensive transponder is able to fulfil the aforesaid requirements, namely that the transponder shall be adapted both to manufacture and also to subsequent use in the product manufactured.

SUMMARY OF THE INVENTION

The present invention thus relates to a method of storing life data, or history data, of complicated products, primarily various types of automotive vehicle, particularly cars, comprising the contactless transmission of information between a transmitter/receiver unit and a transponder, said transmitter/receiver unit including one or more oscillators, transmitter and receiver antennas, a modulator and a detection circuit, and the transponder including a transmitter/receiver antenna, a modulator and a detection circuit, said transponder being intended to accompany the product during its manufacture and also to accompany the finished product, said method being characterized in that the transponder is caused to communicate contactless with both said transmitter/receiver unit and a transmitter-receiver device located in a product and incorporated in a data network in said product, in that the data network in the product is made identical to or compatible with the data network used for the contactless transmission between the transmitter/receiver unit and the transponder during manufacture of the product.

BRIEF DESCRIPTION OF THE DRAWINGS

The invention will now be described in more detail, partly with reference to an exemplifying embodiment of the invention illustrated in the accompanying drawings, in which FIG. 1 illustrates schematically a communication link constructed in accordance with known techniques;

FIG. 2 illustrates schematically a communication link with inductive coupling;

FIG. 3 illustrates schematically a communication link with capacitive coupling; and FIG. 4 illustrates schematically, among other things, an auxiliary unit for a transponder.

DESCRIPTION OF THE PREFERRED EMBODIMENTS

The present invention relates to a method of storing data concerning the life history of complicated products, primarily different types of automotive vehicle, particularly cars, comprising the contactless transmission of information between a transmitter/receiver unit and a transponder. The transponder may be of any suitable known kind, and it will therefore be understood that the invention is not limited to the use of any particular type of transponder.

In the following, the invention is described with reference to its application with cars, although it will be understood that the invention can be applied with all sorts of products that are complicated and with which it may be important to have knowledge of production data in, for instance, the subsequent service of the product concerned. In addition to cars, examples of such products include household machines, electronic apparatus, copying machines, etc. The transponder is thus intended to accompany the product during its manufacture and also to accompany the finished product.

To this end, the transmitter/receiver unit includes one or more oscillators, transmitter and receiver antennas, a modulator and a detection circuit. The transponder includes a transmitter/receiver antenna, a modulator and a detection circuit.

FIG. 1 is a block schematic of a serial two-wire data bus constructed in accordance with Swedish Patent Specification No. SE 8802230-6 (WO 89/12935), in which there is provided on the "master"-side a transmitter which includes an oscillator 1 which is intended to transmit a signal to a receiver 2 on the "slave"-side in a so-called cordless manner. The transmitter includes a modulator 3, to which there is connected a clock line 5 and a data line 4 belonging to the serial bus.

The modulator is intended to modulate the signal generated by the oscillator, this modulated signal being transmitted.

The receiver 2 is intended to deliver the received signal to a demodulator 6 which has an output 7 for the clock line 8 of said bus and an output 9 for the data line 10 of said bus. The demodulator 6 is intended to recreate the signal content in the clock line 4 and the data line 5 respectively. The receiver 2 and the demodulator 6 are included in the transponder, which is also provided with a memory 13, see FIG. 4. The memory is constructed so that information can be both written into and read from the memory.

With regard to the construction of the transponder, the transponder can be constructed without its own local oscillator, when arranged in accordance with Swedish Patent Application 8902808-8, International Publication No. WO91/03109), where the transmitted clock signal generates an internal frequency. The person skilled in this art is fully capable of constructing the transponder in this manner. However, the transponder may also be provided with a local oscillator, in a known manner.

According to one preferred embodiment, the frequency generated in the oscillator 1 is comparable with the data speed applied and is therewith in the order of magnitude of kHz.

In accordance with one preferred embodiment, the aforesaid cordless transmission is effected with the aid of an inductive transmission device, where both the aforesaid transmitter and the aforesaid receiver include a coil 11, 12, see FIG. 2.

FIG. 2 illustrates schematically an arrangement which is in accordance with a first embodiment of the invention, in which the oscillator 1 drives an alternating current through the transmitter coil 11, see FIG. 3a, this alternating current being sinusoidal, for example. An alternating voltage is generated in the receiver coil 12 by inductance coupling.

Although not shown, the receiver 2 includes a rectifier bridge and a smoothing capacitor, thereby producing a direct voltage for transponder operation. By using a nonvolatile memory in the transponder, i.e. a memory which maintains information without having a voltage applied thereto, no battery is needed in the transponder. This is an important feature, because it enables the transponder to be mounted on the chassis of the car as the car passes through the varnishing ovens, without needing to insulate the transponder to an extent such as to ensure that the transponder will not be heated to a temperature harmful to the battery.

What has been described above with reference to FIGS. 1 and 2 belongs to the known prior art.

According to the present invention, the transponder is caused to communicate in a contactless fashion with both the transmitter/receiver unit 27 and a transmitter device provided in a product and incorporated in a data network in said product, and in that the data network in the product is made identical to or compatible with the data network used for the contactless transmission between the transmitter/receiver unit 27 and the transponder 24 during the manufacture of the product.

This affords significant advantages. One important advantage is that it enables the transponder to be produced in a simple and inexpensive basic design, which accompanies the product all the way, where it is unnecessary to interfere with the transponder or the transponder connections in order for the transponder to be able to communicate with, for example, the onboard computer of a car. The transponder is attached in some suitable position on the bottom plate of the car at the beginning of the production line. The transponder is not subsequently moved from this position. When fitting the electric cables and wires to the car, a transmitter/receiver device is fitted and connected through said cables to the onboard computer of the car. This transmitter/receiver device is constructed as and corresponds to the transmitter/receiver unit 1, 3-5, 11. Because the transmitter/receiver device is incorporated in the data network of the product, and because the data network in the product is made identical to or compatible with the data network used for the contactless transmission between the transmitter/receiver unit and the transponder during manufacture of the product, the transponder is immediately ready for communication when the transmitter-receiver device is fitted to the product.

According to one preferred embodiment, the communication interface at the transponder is inductive. This interface thus lies between the coils 11, 12. When the size of the transponder is in the order of some few centimeters, the range of such inductive transmission will be in the order of 1 meter.

According to another preferred embodiment of the invention, the communication interface at the transponder 29 is capacitive. This is illustrated in FIG. 3, in which the same reference figures as those used in FIG. 2 have been used to identify equivalent or corresponding devices. In this embodiment, a number of electrodes 14-17 are used for transmission, instead of coils. It is also conceivable to combine a capacitive communication interface with coils for transmitting energy to the transponder inductively. The range of a capacitive communication interface is in the order of 1 decimeter.

Thus, the transmitter device fitted to the vehicle is caused to transmit and receive signals from the transponder, in the same manner as the transmitter/receiver unit, i.e. inductively or capacitively.

Another important advantage provided by the invention is that, during manufacture, the transponder may be given a longer range than the aforesaid ranges, by fitting an auxiliary unit temporarily to the transponder.

According to one preferred embodiment, the transmitter/receiver unit is therefore caused to communicate by transmitting and receiving signals of microwave frequency, at the same time as the transponder is caused to communicate at its communication interface in the aforesaid manner, i.e. either inductively or capacitively, by means of a transponder auxiliary unit.

The auxiliary unit is caused to convert received signals of microwave frequency to an inductive or, alternatively, a capacitive signal for transmission to the transponder, and also to convert signals transmitted by the transponder to signals of microwave frequency and to transmit these signals to the transmitter/receiver unit.

This is illustrated in FIG. 4, in which the reference numeral 20 identifies the transmitter/receiver unit with a microwave antenna 21. The reference numeral 22 identifies the auxiliary unit with its antenna 23. The auxiliary unit may be constructed to include a microwave receiver of known kind which is adapted, in a suitable known manner, to control means intended to control the current in a transmitter coil 11 in accordance with the modulation of the received microwave signal. The auxiliary unit is adapted to control a modulator in response to the signal transmitted by the transponder coil 12, in a corresponding manner, such that the transmitted microwave signal is modulated to contain the same information as that transmitted by the transponder coil 12.

The area or section bordered by broken lines in FIG. 4 constitutes the transponder 24 in its basic design. As a result of the temporarily fitted auxiliary unit, the transmitter/receiver unit 20 will understand the region 25 defined by chain lines to be a transponder. The temporary use of the auxiliary unit 22 temporarily increases the range. The auxiliary unit, however, is reused and therefore does not add to the cost of the transponder. The transponder 24 can thus be of a very inexpensive and simple basic design.

According to one preferred embodiment, the aforesaid auxiliary unit forms an additional memory, by means of which the data storage capacity of the transponder is increased when the transponder 24 coacts with the auxiliary unit 22. This additional memory is reference 26 in FIG. 3. This enables the memory of the transponder 24 to be made smaller and less expensive.

This additional memory is often necessary during the manufacturing phase of a product, in order to be able to store all of the production data. In car manufacture, the need of a memory is great on the assembly line. The assembly line also has the need of a long-range transponder. There is less need for a memory upstream and downstream of the assembly line. The demand placed on transponder range is also less stringent.

In the aforegoing, the auxiliary unit has been exemplified by working with microwave frequencies.

However, light can be used as the communication means, instead of microwaves.

Accordingly, in accordance with one embodiment, the transmitter/receiver unit is caused to communicate by transmitting and receiving light signals, such as infrared light, while the transponder is caused to communicate at its communication interface in the aforesaid manner, i.e. inductively or capacitively, with a transponder auxiliary unit, this auxiliary unit being caused to convert received light signals to an inductive or, alternatively, a capacitive signal for transmission to the transponder, and also to convert signals transmitted by the transponder to light signals and transmit these light signals to the transmitter/receiver unit.

I claim:

1. A method for storing product-related data for retrieval during manufacture of a product and for retrieval during use of the product after manufacture, said method comprising:
   a. providing a transponder including a non-volatile memory for retaining product-related data including both product production data and product operation data, antenna means for receiving and for transmitting data signals, a receiver for receiving a modulated signal from a data transmitter, a demodulator coupled with the receiver for demodulating the modulated signal and coupled with the memory for conveying the modulated signal to the memory;
   b. attaching the transponder to the product during manufacture of the product for retention by the product during manufacture and during use of the product subsequent to manufacture;
   c. transmitting product production data between the transponder and a product manufacturing data transmitter/receiver while the product is being manufacture, for retention in the transponder memory of product manufacturing data for subsequent retrieval;
   d. providing on the product a data network including an apparatus for receiving and storing product operating data, wherein the product operating data receiving and storing apparatus is adapted for communication with the transponder carried by the product;
   e. retaining the transponder on the product after manufacturing operations on the product have been completed and while the product is in its intended use;
   f. recording product operating data in the transponder memory as the product is being used for its intended purpose; and
   g. communicating product operating data and product production data between the transponder and a product operating data receiving apparatus after the product has been manufactured and has been in use.

2. A method in accordance with claim 1 wherein the communication to and from the transponder is effected by inductive coupling.

3. A method in accordance with claim 1 wherein the communication to and from the transponder is effected by capacitive coupling.

4. A method in accordance with claim 1 including the step of mounting a transmitter on the product, the product-mounted transmitter adapted to communicate with the transponder and with a transmitter/receiver external to the product, and wherein the product-mounted transmitter communicates with the transponder and with the transmitter/receiver external to the product by inductive coupling.

5. A method in accordance with claim 1 including the step of mounting a transmitter on the product, the product-mounted transmitter adapted to communicate with the transponder and with a transmitter/receiver external to the product, and wherein the product-mounted transmitter communicates with the transponder and with the transmitter/receiver external to the product by capacitive coupling.

6. A method in accordance with claim 1 including the step of providing on the product an auxiliary transmitter/receiver for communication with the transponder, the auxiliary transmitter/receiver coupled inductively with the transponder for communication therewith and adapted for microwave communication of product production data with a transmitter/receiver that is external to the product.

7. A method in accordance with claim 1 including the step of providing on the product an auxiliary transmitter/receiver for communication with the transponder, the auxiliary transmitter/receiver coupled capacitively with the transponder for communication therewith and adapted for microwave communication of product production data with a transmitter/receiver that is external to the product.

8. A method in accordance with claim 1 including the step of providing on the product an auxiliary transmitter/receiver for communication with the transponder, the auxiliary transmitter/receiver coupled inductively with the transponder for communication therewith and adapted for communication by light signals of product production data with a transmitter/receiver that is external to the product.

9. A method in accordance with claim 1 including the step of providing on the product an auxiliary transmitter/receiver for communication with the transponder, the auxiliary transmitter/receiver coupled capacitively with the transponder for communication therewith and adapted for communication by light signals of product production data with a transmitter/receiver that is external to the product.

10. A method in accordance with claim 6 wherein the auxiliary transmitter/receiver includes a memory to provide additional data storage capacity.

11. A method in accordance with claim 7 wherein the auxiliary transmitter/receiver includes a memory to provide additional data storage capacity.

12. A method in accordance with claim 8 wherein the auxiliary transmitter/receiver includes a memory to provide additional data storage capacity.

13. A method in accordance with claim 9 wherein the auxiliary transmitter/receiver includes a memory to provide additional data storage capacity.

* * * * *